B. H. WILLIAMSON.
BEVEL JOINT DETAILER PARTICULARLY ADAPTABLE FOR STRUCTURAL STEELWORK.
APPLICATION FILED MAR. 8, 1915.

1,172,510. Patented Feb. 22, 1916.

WITNESSES.

INVENTOR
BERTRAM. H. WILLIAMSON.

UNITED STATES PATENT OFFICE.

BERTRAM HIGGINSON WILLIAMSON, OF PETERBOROUGH, ONTARIO, CANADA.

BEVEL-JOINT DETAILER PARTICULARLY ADAPTABLE FOR STRUCTURAL STEELWORK.

1,172,510.  Specification of Letters Patent.  Patented Feb. 22, 1916.

Application filed March 8, 1915. Serial No. 13,083.

*To all whom it may concern:*

Be it known that I, BERTRAM HIGGINSON WILLIAMSON, of the city of Peterborough, in the county of Peterborough, in the Province of Ontario, Canada, have invented certain new and useful Improvements in Bevel-Joint Detailers Particularly Adaptable for Structural Steelwork, of which the followings is the specification.

My invention relates to improvements in bevel joint detailers particularly adaptable for structural steel work and the object of the invention is to devise a device whereby the necessity of making a detail lay out of all the parts to find the proportions required to give the necessary clearance space between the horizontal and vertical members of the panel and the inclined member is dispensed with and it consists essentially of a rectangular indicator plate divided vertically and horizontally by scale lines and a pointer arm pivoted on its center line at one corner of the aforesaid rectangular scale, such pointer arm being divided by correspondingly spaced longitudinal and cross scale lines as hereinafter more particularly explained by the following specification.

Figure 1:
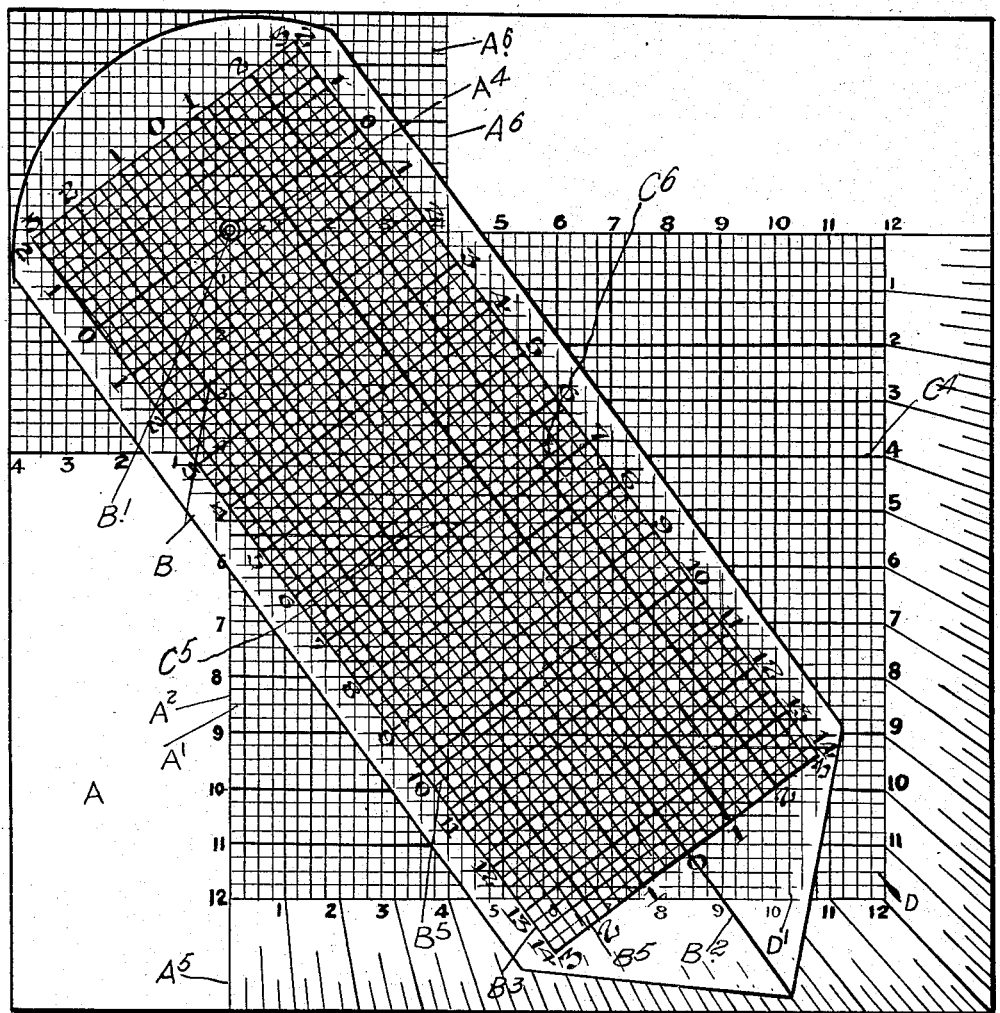
Figure 2:
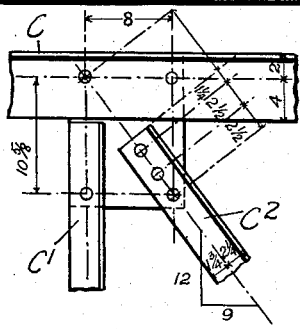
Figure 3:
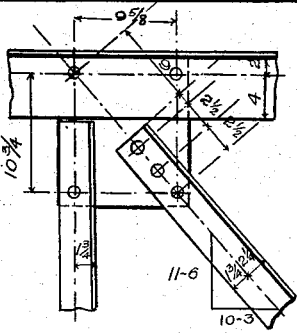
Figure 4:
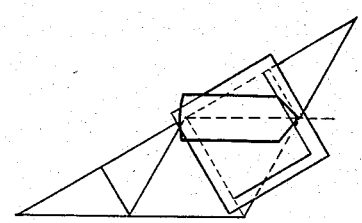

Figure 1, is a plan view of my device. Figs. 2, 3 and 4 are diagrams showing the adaptation of my device to structural steel work.

In the drawings like letters of reference indicate corresponding parts in each figure.

A is a rectangular plate or card divided equally and horizontally by cross scale lines $A'$ and vertically by scale lines $A^2$ extending at right angles to the scale lines $A'$.

B is a pointer arm of transparent material which is pivoted at a point $B'$ located on its center line $B^2$ to the plate or card A at the corner $A^4$ of the rectangular scale. The pointer arm B is provided with a series of longitudinal scale lines $B^3$ extending parallel to the center line $B^2$ and cross scale lines $B^5$ extending at right angles to the longitudinal scale lines.

It will, of course, be understood that the scale lines of the pointer arm B and the plate or card A correspond, the longitudinal and cross lines of each scale being suitably numbered in scale inches.

$A^5$ are a series of lines extending from each scale inch point along the bottom at the right hand side of the rectangular scale, such lines extending radially from the center of the swinging pointer arm so as to indicate the various angles. The upper end of the pointer arm above the pivot point is also similarly divided and co-acts with the rectangular extension $A^6$ of the rectangular scale $A'$ as will hereinafter appear.

Having described my device I will briefly describe three simple methods of its application.

In Fig. 2, I show a horizontal member forming a top chord C of six inch angle, a vertical member $C'$ of three inch angle and a diagonal inclined member $C^2$ of four inch angle set at an angle of nine inches and twelve. In order to quickly find out the correct distance between the working point and the end of the incline member in order to provide the necessary clearance between the end of such inclined members and the vertical and horizontal members of the panel formed by the top chord C and the vertical member $C'$ I place the center line $B^2$ of the pointer arm at 9 of the lower horizontal scale as indicated in Fig. 1 of the drawings. This gives the incline or bevel of the inclined or diagonal member. I then follow the line $C^4$ which is four inches down from the top of the rectangular scale, such four inches corresponding to the distance between the horizontal line passing through the working point and the bottom edge of the top chord. I follow this line $C^4$ until it intersects a line two and one-quarter inches from the center line of the pointer arm following cross line $C^5$ of the scale to the intersecting point, which in this instance, occurs at $C^6$. This point, it will be readily seen, is indicated by the longitudinal lines of the scale arm as six and three-quarter inches from the working point. Therefore, the end of the inclined or bevel member should be about seven inches from the working point to give the required clearance between the end thereof and the adjacent edges of the horizontal and vertical members of the panel.

Now assuming that the distance between the end of the inclined or bevel member and the center of the first rivet is one and one-quarter inches and that there are three rivets employed having a distance of two and one-half inches between centers, the distance between the working point and the center of the last or lowermost rivet will be thirteen and one-quarter inches and the horizontal distance between the center of the rivet and the center of the vertical member will be eight inches and the vertical distance between the center of the rivet and the horizontal line extending through the working point will be ten and five-eighths inches. By this means the rivet spacing in the top member or chord will be regulated, also the size of the gusset plate connecting the top chord, vertical member and inclined or bevel member together.

In Fig. 3 I will assume that the only dimension given in reference to the incline or bevel member is the horizontal dimension from the center of the vertical member which in the example given is ten foot three inches and from the center of the vertical member eleven foot six inches, the sizes of the horizontal member and vertical member and incline or bevel member remaining the same as described in connection with Fig. 2. In order to find the bevel of the inclined member all that it is necessary to do is to swing the arm B until the center line thereof extends over the intersection between the horizontal line D which is a line eleven foot six from the top of the scale and the line B' which is ten foot three inches at the scale from the left hand side of the rectangular scale portion. It will, of course, be understood that the line forming the left hand side of the scale portion represents the working line extending through the vertical member of the panel and the top horizontal line of the scale portion represents the working line of the top chord. When the scale arm has been placed in this position the center line of the scale arm as indicated by the dotted line represents the required incline of the inclined or bevel member, which incline may be read off on the scale formed by the radial lines extending around the edge of the plate or card A. After this incline has been found I follow the method already described and illustrated in connection with Fig. 2.

In Fig. 4, I illustrate a case in which the bevels and centers are not yet known but in which the center lines are laid out to scale.

By placing my indicator in the position shown in Fig. 4 with the center line of the pointer arm coinciding with the center truss line and extending the center truss line out to the edge of the plate or card the incline of the truss member required to be given is indicated. After this incline has been found I follow the method already described and illustrated in connection with Fig. 2. In order to similarly calculate measurements on the other side of the working line of the vertical member I have provided extensions scale $A^6$ hereinbefore described with which the upper end of the scale arm co-acts.

From this description it will be seen that I have devised a very simple device whereby detail calculations which would ordinarily consume considerable amount of time in working and laying them out is arrived at almost instantaneously and will therefore only necessitate the laying out of certain construction lines from which the other calculations may be quickly made at any time by means of my indicating device.

What I claim as my invention is.

1. A bevel joint detailer comprising a base plate having a rectangular scale portion divided into equal portions by vertical and horizontal scale lines and provided with suitable indicating numbers, a transparent pointer arm pivotally connected to such base plate at one corner of the scale portion and extending over the same and provided with longitudinal and cross scale lines forming divided portions equal to the portions of the aforesaid rectangular scale, such horizontal and cross lines being suitably numbered.

2. A bevel joint detailer comprising a rectangular base plate having a rectangular scale portion divided into equal portions by vertical and horizontal scale lines and provided with suitable indicating numbers, a transparent pointer arm pivotally connected to such base plate at one corner of the scale portion and extending over the same and provided with longitudinal and cross scale lines forming divided portions equal to the portions of the aforesaid rectangular scale, such horizontal and cross lines being suitably numbered, and an angular scale portion extending from two sides of the rectangular scale portion, the scale lines of which are radial to the center of swing of the pointer arm.

3. A bevel joint detailer comprising a rectangular base plate having a rectangular scale portion divided into equal portions by vertical and horizontal scale lines and provided with suitable indicating numbers, a transparent pointer arm pivotally connected and intermediately of its center line to such base plate at one corner of the scale portion and extending over the same and provided with longitudinal and cross scale lines forming divided portions equal to the portions of the aforesaid rectangular scale, such horizontal and cross lines being suitably numbered, and a rectangular scale portion divided by horizontal and cross lines parallel with the horizontal and cross lines of the aforesaid scale portion, the center of which coincides with the corner of the aforesaid scale portion and the center of swing of the scale arm.

BERTRAM HIGGINSON WILLIAMSON.

Witnesses:
W. C. BARRIE,
F. C. McNELLAN.

Copies of this patent may be obtained for five cents each, by addressing the "Commissioner of Patents, Washington, D. C."